July 24, 1956  E. G. McKIBBEN ET AL  2,755,724
PLOW WITH TRASH MOVING MECHANISMS
Filed Oct. 25, 1951  2 Sheets-Sheet 2
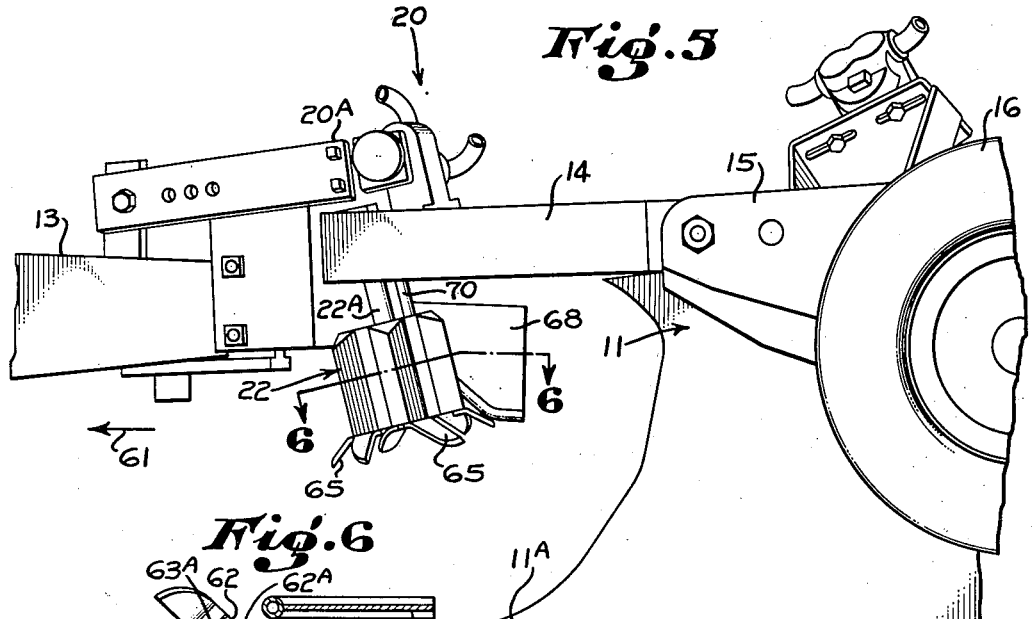
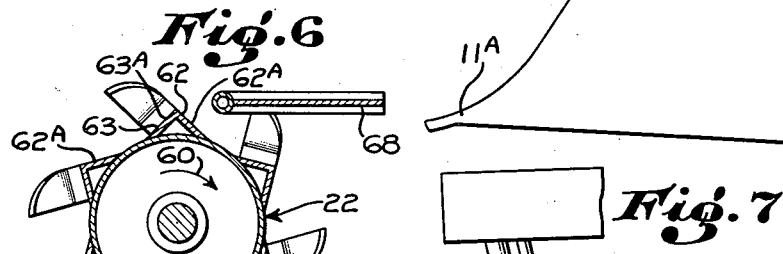
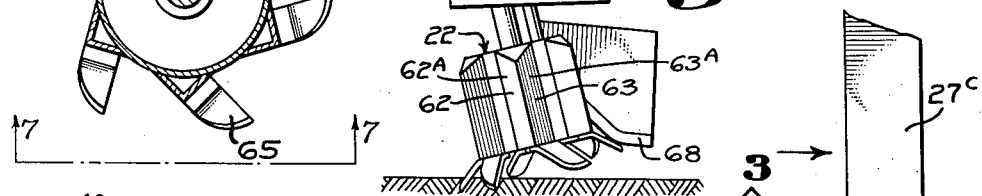
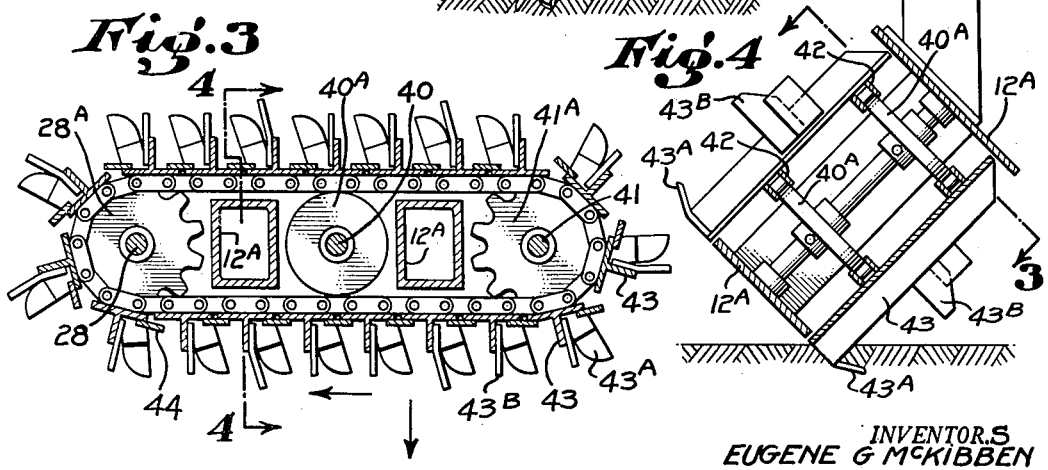
INVENTORS
EUGENE G McKIBBEN
ARNOLD B. SKROMME
BY Lyon & Lyon
ATTORNEYS

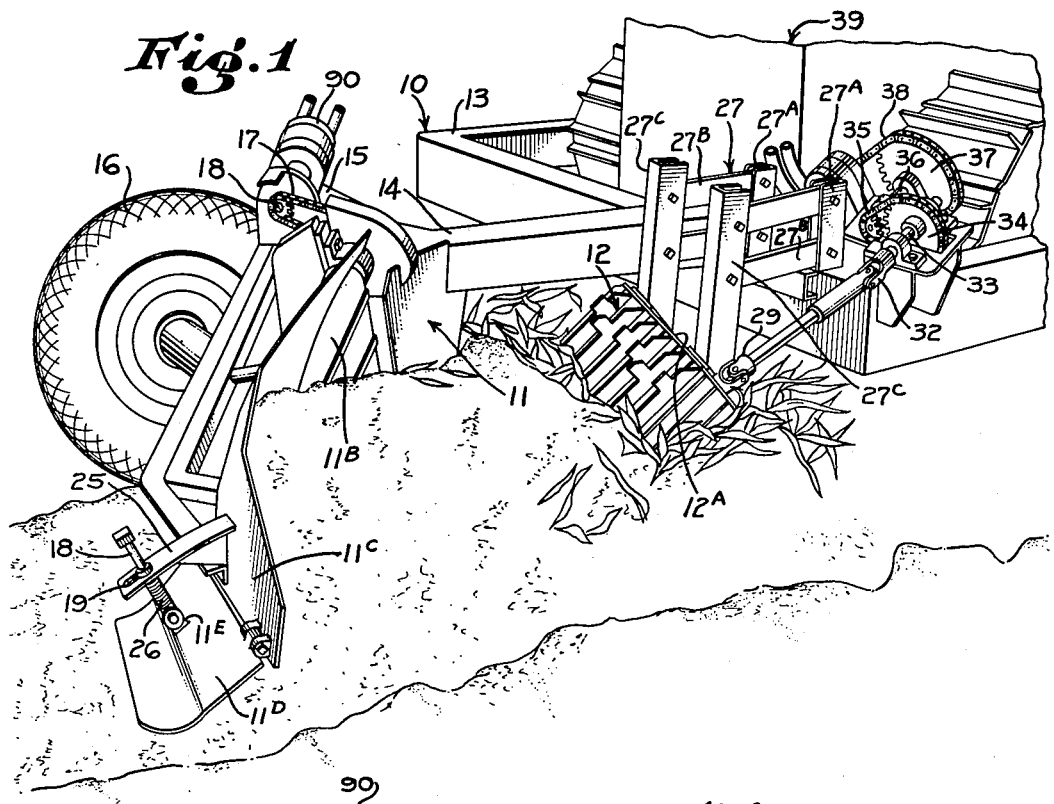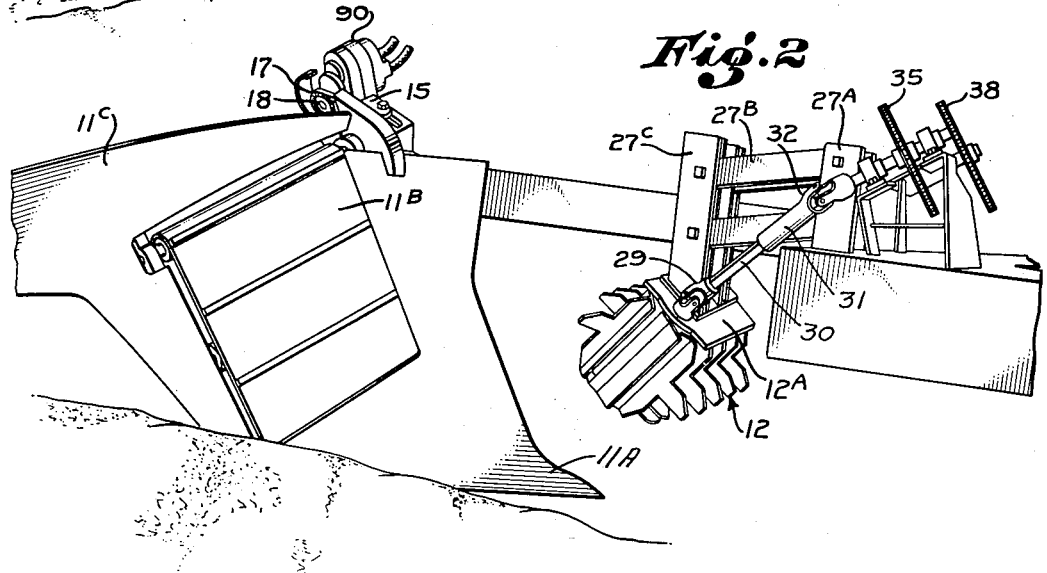

United States Patent Office 2,755,724
Patented July 24, 1956

2,755,724
PLOW WITH TRASH MOVING MECHANISMS

Eugene G. McKibben, Auburn, Ala., and Arnold B. Skromme, Ottumwa, Iowa, assignors to Pineapple Research Institute of Hawaii, Honolulu, Territory of Hawaii, an association of the Territory of Hawaii Application October 25, 1951, Serial No. 253,074

4 Claims. (Cl. 97—194)

The present invention relates to improved plows particularly useful for the purposes described generally in the copending patent application of Arnold B. Skromme, Serial No. 81,186, filed March 12, 1949, now Patent No. 2,689,512, for "Short-Cycle Plow," and assigned to the same assignee as the present invention, and relates generally to improvements in plows of the character described in such application.

The present invention contemplates the provision of an improved plow especially useful in plowing soil sustaining much vegetation or heavy crop residue of the type, for example, found in the pineapple fields of Hawaii. Preparation of suitable seed beds in previously harvested pineapple fields is complicated by the amount and type of growth remaining on the field after the pineapples are harvested. The amount of this growth may amount to 50 or 100 tons or even more per acre. In comparison, this amount is approximately four to eight times the weight of a good crop of ensilage corn of the type cut for silage in the Midwestern States.

In accordance with the present day practice of preparing suitable seed beds in previously harvested pineapple fields, it is usually necessary to first knock down and cut up the old remaining growth or ratoon by the use of a rotary tiller, disk harrow, shredder, pineapple "stump splitter" or other implement many times and then to plow the field from three to seven times with the disk plows over a period from four to eleven months to bury the ratoon and other debris or trash under the soil. It is apparent that such customary operations require many man hours, different types of tools, and the expenditure of an excessive number of mechanical horsepower hours over relatively long periods of time during which the pineapple field remains unproductive.

While the plow described in the above mentioned patent application serves to minimize the problems involved and to shorten greatly the soil preparation time, the present invention constitutes an improvement in this type of plow, in that a ratoon or trash moving mechanism is incorporated in the plow so that, in general, the result sought for is obtained with greater efficiency.

It is therefore a general object of the present invention to provide an improved plow of this character which, while particularly useful in plowing previously harvested pineapple fields, may of course be used where other similar agricultural operations are to be performed.

Another object of the present invention is to provide an improved plow of this character which, instead of incorporating a coulter for purposes of cutting and separating the ratoon or trash for purposes of facilitating its movement, uses mechanisms which function generally to move the trash or ratoon laterally for subsequent coverage by the soil subsequently worked by the plow share.

Another object of the present invention is to provide an improved plow of the type mentioned in the previous paragraph, characterized by the fact that the trash moving mechanism is either a drum or a conveyor.

Another object of the present invention is to provide improved trash moving mechanisms of the type described in our copending patent application for "Trash Mulch Seed Bed Machine," filed October 25, 1951, Serial No. 253,152, and assigned to the same assignee as the present invention, and to adapt the same to plows which may be used in plowing the ground before the trash mulch seed bed machine described in such application is used on the field.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view showing a plow, in service, embodying features of the present invention;

Figure 2 is another perspective view of the same plow with the trash moving mechanism, however, suspended for purposes of illustrating its position, when in operation, with respect to the plow share which enters the ground a substantial distance below this mechanism;

Figure 3 is a longitudinal cross sectional view taken through the trash moving mechanism shown in Figures 1 and 2, and corresponds generally to a sectional view taken on the lines 3—3 of Figure 4;

Figure 4 is a sectional view taken substantially in the direction indicated by the lines 4—4 in Figure 3;

Figure 5 is a perspective view showing another plow which incorporates a modified trash moving mechanism;

Figure 6 is a sectional view taken substantially on the line 6—6 of Figure 5; and Figure 7 is a sectional view taken substantially on the line 7—7 of Figure 6 for illustrating generally the relationship of the trash moving mechanism in Figure 5 with respect to the surface of the ground.

The two plows 10 and 20 shown herein respectively in Figures 1 and 5 both incorporate a device for moving the pineapple ratoon or trash so that such trash may be moved out of the path of movement of the plow share and moldboard 11 for subsequent coverage by the soil which is subsequently moved and deflected by such plow share and moldboard. Such trash moving mechanism 12 in Figure 1 is in the form of an endless belt, and in Figure 5 takes the form of a drum 22.

Such trash moving mechanisms 12 and 22 in Figures 1 and 5, respectively, serve generally to replace the notched power driven coulter described in the aforementioned patent application, Serial No. 81,186, and functions generally, first to make a path for the plow share and moldboard, and second to move the surface layer of trash or ratoon towards the furrow so that it will become deeply covered with soil. These two general functions are achieved with a relatively small amount of power since these mechanisms 12, 22 are not required to work below the surface of the soil, as does the coulter described in the aforementioned application, Serial No. 81,186.

The plows shown in Figures 1 and 5 are both intended to be pulled through the field by a tractor, and for that purpose the plows are mounted on the trailing end of the U-shaped tractor frames 13, 13, respectively.

The plow share and moldboard in the plows shown in Figures 1 and 5 are of identical construction and of the same construction as shown in the aforementioned patent application, Serial No. 81,186, and are mounted with respect to the tractor frames 13, 13 in Figures 1 and 5, respectively, in the same manner.

The plow beam 14 has its forward end pivotally secured to the U-shaped frame 13 and the rearwardmost end of such horizontal plow beam 14 is secured to the frame 15. The frame 15 rotatably supports the pair of ground engaging wheels 16 (only one of which is shown in the drawings), with the forward end of the plow share 11A an appreciable distance beneath the soil surface. The frame 15 also serves to rotatably support the power driven moldboard 11B, which functions generally to move the plowed soil upwardly and direct such plowed soil outwardly to the soil deflecting wings 11C carried on the frame 15. This moldboard 11B is power driven by the hydraulic motor 90 on the tractor through the endless chain 17 and shaft 18, all as described in the aforementioned application, Serial No. 81,186. In this instance, as shown in Figure 1, a pivoted spring biased flap 11D is pivotally secured to the lower end of the wing 11C, so as to cause the soil to be spread more uniformly. This flap 11D has a lower arcuate soil engaging end, and an intermediate portion of such flap 11D carries the bracket 11E to which is pivotally secured the bolt 18 passing through a motion limiting slot 19 in the arm 25, which is fastened to the wing 11C. A coil compression spring 26 on the bolt 18 acts between the arm 25 and bracket 11E to press the flap 11D downwardly.

The trash moving conveyor 12 in Figure 1 is pivotally mounted on the pivoted frame 13 by means of pivoted parallelogram support 27. For this purpose the U-shaped frame 13 carries the pair of upstanding bracket members 27A, 27A to which are pivotally secured the generally horizontally extending pairs of arms 27B, 27B. The rearward ends of these arms 27B are pivotally secured to the upstanding arms 27C, 27C which have their lower ends secured to the frame 12A of the conveyor 12.

Power to the input shaft 28 of the conveyor is supplied through the universal joint 29 and the pair of splined telescoping shafts 30, 31, which provide an extensible connection. The forward end of the shaft 31, in turn, is coupled through the universal joint 32 to the shaft 33 rotatably supported on the tractor frame 13. This shaft 33 mounts a chain sprocket wheel 34. The wheel 34 is coupled through chain 35, shaft 36, sprocket wheel 37 and the chain 38, to a power takeoff shaft (not shown) of the tractor 39 or by a hydraulic motor of the character designated by the reference numeral 90.

Detailed constructional features of the conveyor 12 in Figure 1 are shown in Figures 3 and 4.

The conveyor frame includes a pair of parallel extending spaced plates 12A in Figure 4, which rotatably support the ends of shafts 28, 40 and 41. The shafts 28 and 41 each have keyed thereto a pair of sprocket wheels 28A, 41A, respectively, over which the endless chains 42, 42 pass. The intermediate shaft 40 has keyed thereto a pair of idler chain engaging rollers 40A, 40A.

These spaced endless chains 42, 42 have welded thereto an assemblage of plates and angle irons to provide generally growser elements and shield elements, in a manner described hereinafter. These plates and angle irons are welded to these chains 42, 42 in such a manner that the chain may be disconnected at any one of its joints for purposes of easy removal or replacement.

The series of growser elements 43 each have a generally T-shaped cross section, as shown in Figure 3, and are fabricated by welding, for example, an angle iron piece to a flat metal piece. The series of shield plates 44 are each intended to cover or shield the space between adjacent growser elements 43, and consist simply of a flat metal plate welded along one of its edges to the leading edge of a corresponding growser element 43.

Each one of these growser elements 43 has welded thereto two types of fingers, namely, a ground engaging finger 43A and an upper trash engaging finger 43B.

This entire conveyor is hung from the tractor frame 13, so that the rotational axis of the same makes an angle in the range of between 10 and 45° with respect to the vertical. Figure 4 shows such rotational axes tipped forwardly in the order of 45°. Such tipping serves to raise the fingers 43A at the back of the conveyor above the ground, so that they may clear themselves of the trash and to prevent such fingers 43A, in their backward movement, from dragging the trash back around the periphery of the conveyor.

It is observed that the lower bearing supporting frame member 12A in Figure 4 serves not only as a bearing support, but provides an emergency rubbing surface should some large obstruction strike the chains and plates with sufficient force to tend to move them backwards; further, such lower frame members 12A acts as a shield and prevents soil and foreign matter from entering the space between reaches of the chains.

The speed of the conveyor drive shaft 28 (Figure 3) may vary in the range of 80 to 120 revolutions per minute with a forward tractor speed of 2.2 miles per hour.

The ground engaging fingers 43A are preferably between 1½ to 3 inches long and bent so that their leading edge tilts back in the order of 45° to assist in withdrawal from the crop residue after the residue has been carried outwardly to the point where such fingers begin to move in their curved orbital path to the rear.

It should also be noted with reference to Figure 3 that the ground engaging fingers 43A extend generally parallel to each other while inclined somewhat with respect to the forward movement of the vehicle, and thus assist somewhat in preventing rocks from becoming wedged between the same. However, even if a rock should become wedged between the fingers, such rock is disclodged as the fingers travel around the curved path, wherein the distance between such fingers increases.

Figures 5, 6 and 7 relate exclusively to the use of a drum as a crop residue moving member, and the drive shaft 22A for the same may be rotatably supported on the pivoted frame 20A in the manner described in connection with the previous figures. Such shaft 22A may be driven in the same manner as the shaft 28 in Figure 1, using, for example, an extensible shaft 30 and universal joints to effect rotational movement of the drum 22 in the direction indicated by the arrow 60 in Figure 6, with the plow moving in the direction indicated by the arrow 61 in Figure 5.

The outer surface of the drum, instead of being cylindrical, is modified by welding thereto a series of plates 62, 63 which provide a series of longitudinally forwardly extending flat faces 62A and a related series of backwardly extending faces 63A, such surfaces 62A, 63A being substantially perpendicular one to the other. The forward faces 62A provide a bearing surface for engagement with the trash and debris, so that the same may be engaged and moved efficiently. In other words, by this construction "pockets" defined by the surfaces 63A, 62A are formed, by virtue of which movement of the trash and debris is facilitated.

The lower end of the drum 22 has mounted thereon a series of fingers 65 which extend radially outwardly from the drum and are bent downwardly, as shown in Figure 5, in the direction of the ground. Further, as seen in Figure 6, these fingers 65 have their longitudinal axes inclined backwardly with respect to the direction of rotation 60, so that the same may provide a cutting or slicing action.

The rotational axis of the drum 22 is inclined or tilted in the order of 15° with respect to the vertical axis, so that the fingers 65, in their backward travel with respect to the direction of plow movement, are gradually moved from the position wherein they engage the ground to a position where they are elevated above the ground, so as to allow these fingers to clear themselves of trash and debris whereby the same is prevented from being dragged around the back of the drum with such fingers. Another precaution taken to prevent such undesirable movement of the trash and debris resides in the use of the shield plate 68 (Figures 5 and 6), the plane of which extends generally in line with the direction of plow movement, which is generally tangential to the drum. This shield plate 68 is stationarily mounted on the lower end of the bracket member 70, the upper end of which is secured to the frame 20A.

In operation of the arrangement shown in Figures 5, 6 and 7, the drum 22 revolves in the direction indicated by the arrow 60 in Figure 6, so that the trash or debris is moved towards the direction of the furrow, the drum 22 being tilted forwardly in the order of 15° so that the fingers 65 gradually move upwardly from the ground on the back side of the drum as they return to again engage the trash, to cut or slice the same. The trash or debris leaves the fingers at the contact shield 68. The speed of the durm 22 is such that the linear speed of the fingers 65 is approximately the same as the forward speed of the plow. While this speed is not critical, it is desirable, and as a matter of fact the speed of the fingers may be as much as twenty percent slower or faster than the ground speed of the plow. A relatively high drum speed is considered undesirable, since in such case the fingers thereon tend to drive the trash around and around with the rotor. With the desirable drum speeds mentioned above, the drum moves or pushes the trash to one side as it moves forwardly, and simply lays it on the soil at a point where the fingers are at right angles to forward travel, i. e., at the leading edge of the shield plate 68, where the forward speed of the shield plate 68 is substantially equal to the linear speed of the fingers.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a plow of the character described for conditioning soil having a thick vegetative growth thereon, a share and moldboard arranged to lift and to turn a strip of soil, said share and moldboard being mounted aft of said plow, a power driven orbitally moving device disposed forwardly of said share and moldboard and having cutting fingers circumferentially spaced on the lower portion thereof, said fingers travelling in a plane inclined both with respect to the horizontal and vertical planes and functioning to engage, cut, slice and move vegetative growth for subsequent coverage by the soil worked by said share and moldboard, said device having its rotational axis tipped upwardly and forwardly with respect to plow movement whereby the leading fingers on the device only are in engagement with the ground and the trailing fingers are disposed above the ground, said plane extending downwardly and forwardly of the plow with the leading cutting fingers being disposed closer to the ground than the trailing cutting fingers, said device comprising an endless conveyor with a plurality of trash engaging fingers disposed above the ground engaging fingers.

2. In a plow of the character described for conditioning soil having a thick vegetative growth thereon, a share and moldboard arranged to lift and to turn a strip of soil, said share and moldboard being mounted aft of said plow, a power driven orbitally moving device disposed forwardly of said share and moldboard and having cutting fingers circumferentially spaced on the lower portion thereof, said fingers travelling in a plane inclined both with respect to the horizontal and vertical planes and functioning to engage, cut, slice and move vegetative growth for subsequent coverage by the soil worked by said share and moldboard, said device having its rotational axis tipped upwardly and forwardly with respect to plow movement whereby the leading fingers on the device only are in engagement with the ground and the trailing fingers are disposed above the ground, said plane extending downwardly and forwardly of the plow with the leading cutting fingers being disposed closer to the ground than the trailing cutting fingers, said device comprising an endless belt with a series of articulated growser elements, with shield members bridging the space between adjacent growser elements to prevent the soil from entering between growser elements.

3. In a plow of the character described for conditioning soil having a thick vegetative growth thereon, a share and moldboard arranged to lift and to turn a strip of soil, said share and moldboard being mounted aft of said plow, a power driven orbitally moving device disposed forwardly of said share and moldboard and having cutting fingers circumferentially spaced on the lower portion thereof, said fingers travelling in a plane inclined both with respect to the horizontal and vertical planes and functioning to engage, cut, slice and move vegetative growth for subsequent coverage by the soil worked by said share and moldboard, said device having its rotational axis tipped upwardly and forwardly with respect to plow movement whereby the leading fingers on the device only are in engagement with the ground and the trailing fingers are disposed above the ground, said plane extending downwardly and forwardly of the plow with the leading cutting fingers being disposed closer to the ground than the trailing cutting fingers, said device comprising an endless conveyor with a plurality of trash engaging means disposed above the ground engaging fingers.

4. In a plow of the character described for conditioning soil having a thick vegetative growth thereon, a share and moldboard arranged to lift and to turn a strip of soil, said share and moldboard being mounted aft of said plow, a power driven orbitally moving device disposed forwardly of said share and moldboard and having cutting fingers circumferentially spaced on the lower portion thereof, said fingers travelling in a plane inclined both with respect to the horizontal and vertical planes and functioning to engage, cut, slice and move vegetative growth for subsequent coverage by the soil worked by said share and moldboard, said device having its rotational axis tipped upwardly and forwardly with respect to plow movement whereby the leading fingers on the device only are in engagement with the ground and the trailing fingers are disposed above the ground, said plane extending downwardly and forwardly of the plow with the leading cutting fingers being disposed closer to the ground than the trailing cutting fingers, said device comprising an endless conveyor in the form of a drum with a plurality of trash engaging flat faces thereon disposed above the ground engaging fingers.

References Cited in the file of this patent

UNITED STATES PATENTS

| | | |
|---|---|---|
| 482,602 | Warrington | Sept. 13, 1892 |
| 1,846,323 | Elmore | Feb. 23, 1932 |

FOREIGN PATENTS

| | | |
|---|---|---|
| Add. to 102,870 | France | Mar. 10, 1875 |

(Vol. 14, 3rd series, Group I Class 2, plate 2, pages 1 and 2)

| | | |
|---|---|---|
| 44,733 | Germany | Sept. 22, 1888 |